INVENTORS:
JOSEPH C. HALPINE
BERNARD M. MORONEY

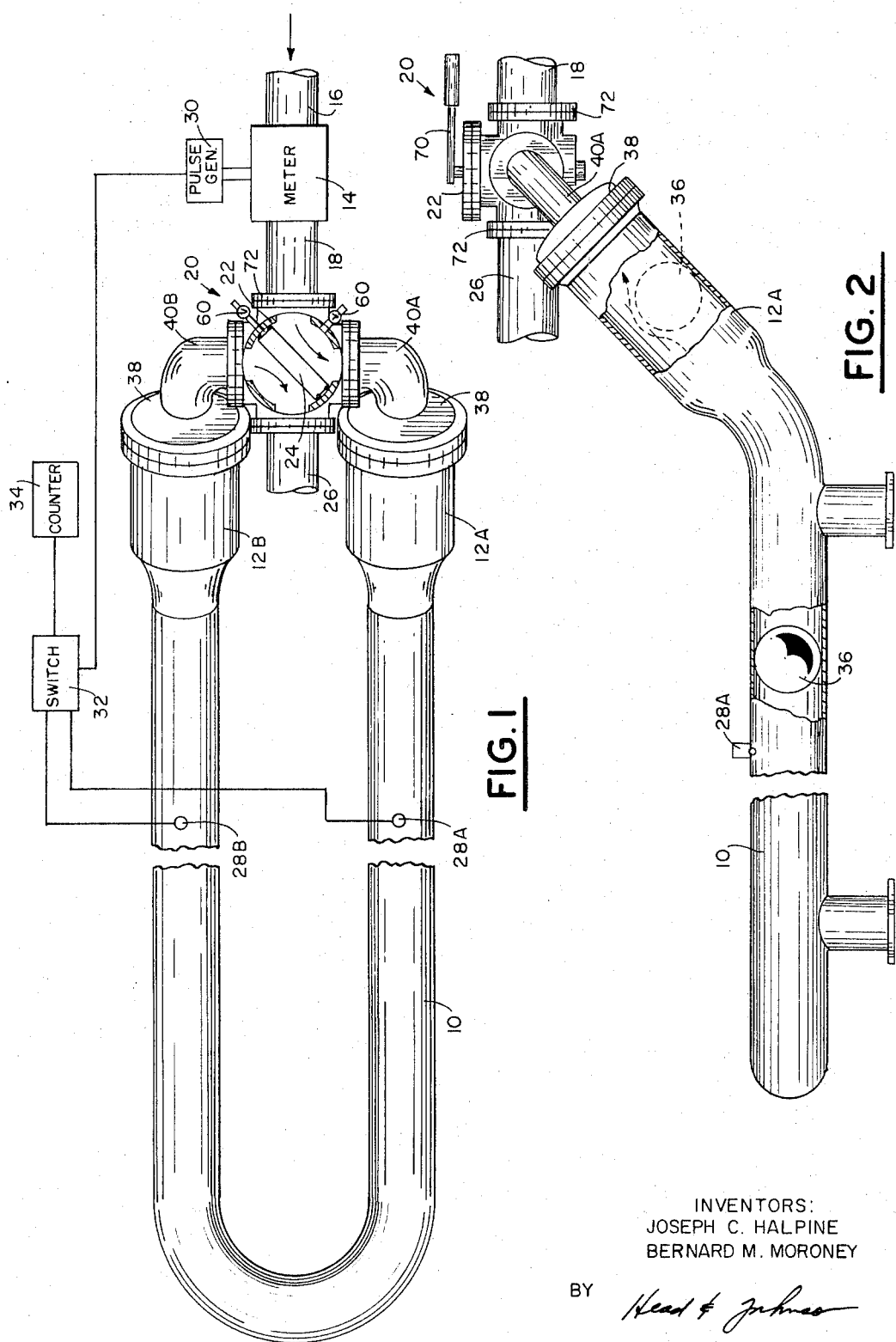

BY
ATTORNEYS

INVENTORS:
JOSEPH C. HALPINE
BERNARD M. MORONEY

BY

ATTORNEYS

United States Patent Office 3,295,357
Patented Jan. 3, 1967

3,295,357
CALIBRATING METERS
Joseph C. Halpine and Bernard M. Moroney, Tulsa, Okla., assignors to Halmor Industries, Inc., Tulsa, Okla., a corporation of Oklahoma
Filed Apr. 14, 1965, Ser. No. 448,170
9 Claims. (Cl. 73—3)

This invention relates to an apparatus for use in calibrating meters. More particularly, the invention relates to improvements in an apparatus used to calibrate meters particularly of the type used to measure the flow of oil products in a pipeline.

Until recently the measuring of quantities of fluid, such as oil or products refined from oil, was typically accomplished by the use of measuring tanks. The oil products were pumped into a tank and the depth of the tank measured as an indication of the quantity, then the tank was emptied. As a step towards more automated measuring of petroleum and petroleum products, and particularly towards the automatic transfer of custody of petroleum products, meters have been utilized as the means of measuring the quantity of products transferred to or through a pipeline. It is apparent that due to the valuable nature of the products being transferred, accuracy of the meter measurements is extremely important.

With the advent of the use of meters the next requirement was to have some means to check their accuracy. Apparatus and methods which have proven successful in the calibration of meters are described in U.S. Patent 2,772,561 to Plank et al., entitled "Apparatus For Calibrating Flowmeters" and U.S. Patent 3,021,703 to Pfrehm, entitled "Proving Meters."

The method taught by both these patents includes a piston moved in a cylinder, the linear displacement of the piston being indicative of the volume of fluid flow. In the Pferhm patent the system is arranged to calibrate on both forward and rearward movements of the piston.

This invention, in one sense, is directed to improvements in the meter calibrating systems of the types disclosed in the Plank et al. and Pfrehm patents.

One problem with present meter calibrating systems, exemplified by the Plank et al. and Pfrehm references, is the large number of valves which must be utilized to divert the fluid flow. For instance, in the Plank et al. patent, at FIGURE 1, nineteen valves plus a check valve are shown. One of the objects of this invention is to provide a system for calibrating meters using only a single valve.

It is an object of this invention to provide a meter calibrator having improved means for catching the movable piston as it moves to the end of a barrel and to automatically return the piston to proper position for recycling.

Another object of this invention is to provide an improved apparatus for calibrating flow meters including improved means of switching the direction of fluid flow within the barrel to obtain cycling of the piston.

Another object of this invention is to provide an apparatus for calibrating flow meters including improved fluid flow conducting means in which the movement of a single lever diverts fluid flow from one direction to the other through the meter calibrating apparatus or in which the flow may be directed so as to not flow through the meter calibrating apparatus in either direction.

Another object of this invention is to provide an apparatus for calibrating flow meters including an arrangement wherein the direction of flow throughout the testing procedure is controlled by a single lever and including means wherein full flow of the fluid may be maintained while the meter is being calibrated and wherein the fluid flow is never blocked regardless of the position of the control lever.

These and other objects and a better understanding of the invention may be had by referring to the following description and claims taken in conjunction with the attached drawings in which:

FIGURE 1 is a top view of the apparatus for calibrating flow meters according to this invention showing the electrical components diagrammatically.

FIGURE 2 is a side view of the apparatus of FIGURE 1.

Figure 5:
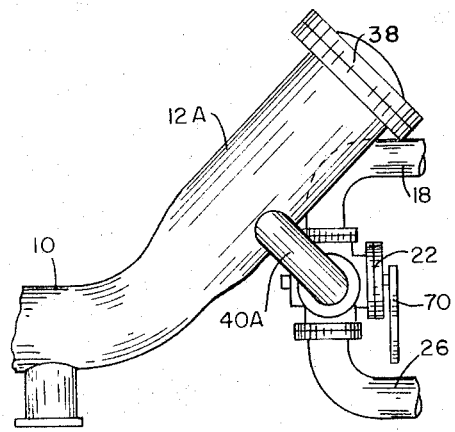
FIGURE 5 is an alternate arrangement of the enlarged ball receiving portion at each end of the U-shaped horizontally extending barrel.

This invention may be described as an apparatus for use in calibrating meters. More particularly, but not by way of limitation, the invention may be described as an apparatus for use in calibrating meters comprising a U-spaced relationship at points in said barrel actuated by diameter, a ball receiving portion of an enlarged internal diameter and extending upwardly at an angle relative to the horizontal, a ball of external diameter substantially equally the internal diameter of the barrel, the ball forming a sealed piston in said barrel, fluid conducting flow means communicating with each ball receiving portion, first and second piston detecting means in longitudinally spaced relationship at points in said barrel actuated by passage of said ball, fluid direction switching means communicating with said fluid conducting flow means whereby fluid may be caused selectably to flow in both directions through said barrel, said ball being moved as a piston by such fluid flow and whereby said ball enters the said inclined enlarged ball receiving portion at the end of each movement, and wherein said ball automatically re-enters said piston when the fluid flow is reversed.

Referring now to the drawings and first to FIGURES 1 and 2, the basic structure of this invention is set forth. FIGURE 1, as previously indicated, is a top view of a meter calibrating apparatus of this invention, the apparatus including a U-shaped horizontally extending barrel 10, the barrel having an even internal diameter throughout its length. One of the important elements of this invention is the provision of enlarged ball receiving end portions 12A and 12B, which will be described in more detail subsequently. A meter 14, which the apparatus of this invention is utilized to calibrate, receives the flow of fluid, such as oil products, through line 16, the fluid passing out of the meter through line 18. Affixed to receive the flow output of line 18 is a fluid direction switching means, generally indicated by the numeral 20, which is an important element of this invention which will be described subsequently. The fluid direction switching means 20 is utilized to control the direction of flow of fluid through barrel 10. The switching means 20 is shown diagrammatically in cross-sectional view and consists basically of a diverting valve 22 having a gate member 24 therein.

Positioned in the barrel 10 are longitudinally spaced piston detecting means 28A and 28B. These serve to detect the passage of the ball or piston within the barrel 10.

Meter 14 is provided with a pulse generator 30 which produces an electrical pulse output directly proportional to the measured flow of fluid through the meter. The electrical pulse output is connected to an electronic switch 32 which is, in addition, connected to piston detector means 28A and 28B. The output of the switch 32 is connected to a counter 34. As the apparatus of this invention is operated the movement of the ball or piston within the barrel 10 first engages one or the other of piston detector switch 28A or 28B to initiate, by switch 32, the counting of the pulse output of generator 30. When the ball reaches the other of the detectors 28 the count is automatically stopped.

The basic meter prover apparatus consisting of barrel 10, meter 14, line 16, fluid direction switching means 20, piston detecting means 28A and 28B, pulse generator 30, switch 32, and counter 34 are described in detail in the above referenced Plank et al. and Pfrehm patents. The improvements of this invention relate to the diverting valve 22 and the ball receiving end portions 12A and 12B.

Referring to FIGURE 2, the meter prover apparatus is shown in side view with the meter and electrical equipment of FIGURE 1 deleted. In this arrangement it can be seen that within the meter prover apparatus is a ball 36 which has an external diameter substantially equal the internal diameter of barrel 10 so that it forms a sealed piston in the barrel. While a piston in the shape of a ball, as illustrated, is preferred, the invention may be practiced utilizing pistons of other configurations.

As shown in FIGURE 2, the enlarged ball receiving portions 12A and 12B extend upwardly at an angle relative to the horizontal and consequently relative to barrel 10. The enlarged ball receiving portion 12A is shown broken away and in dotted outline the ball 36 is shown therein.

The purpose of the ball receiving portion 12A and 12B is to receive the ball 36 as it is moved to the end of the barrel 10 by the effect of fluid flow therethrough. When the ball 36 reaches one end or the other of barrel 10 it enters the enlarged ball receiving portion 12A or 12B. The receiving portions being of larger internal diameter, fluid can easily flow, as indicated by the arrows, around the ball 36 so that it does not in any way block or retard or retire the flow of fluid through the apparatus.

The enlarged ball receiving portions 12A and 12B are, as illustrated, inclined relative to the horizontal. This has three basic purposes. First, such inclination retards the movement of the ball. In cases where high fluid flow rates are encountered ball 36 may leave the end of barrel 10 at a fairly high velocity. The inclination of the ball receiving portions 12A and 12B absorbs the inertial energy of the ball as it leaves the end of barrel 10.

The second advantage of the inclination of the enlarged ball receiving portions 12A and 12B is that the ball entrapped therein tends to return to the barrel 10. In preferred meter calibrating procedure the ball is passed in first one direction and then the other through the barrel. By the provision of the inclined end portions 12A and 12B the ball 36 automatically re-enters the barrel 10 upon fluid flow direction reversal so that no additional device or system is required to move the ball moving into the barrel.

The third advantage of the use of the enlarged upturned ball receiving portions 12A and 12B is that such an arrangement allows the apparatus of this invention to be maintained "on stream" at all times if desired. That is, flow can be directed by the use of the diverter valve 22 so that fluid flow through line 16 is continuously moved in a substantially circular path through barrel 10 and then out through outlet line 26. This has the advantage that the prover apparatus can be maintained at the fluid temperature. Other types of apparatuses for calibrating meters have been devised which do not permit the continuous flow of fluid through the calibrating apparatus. This means that when testing is undertaken and fluid is caused to flow through the calibrating barrel, drastic temperature changes may occur which can materially effect the accuracy of calibration. This arrangement permits continuous fluid flow through the barrel in either direction and in an arrangement wherein, when it is desired to calibrate the meter 14, the fluid flow may be reversed and the ball 36 immediately and automatically re-enters the piston 10 to perform the calibration operation.

Figure 6:
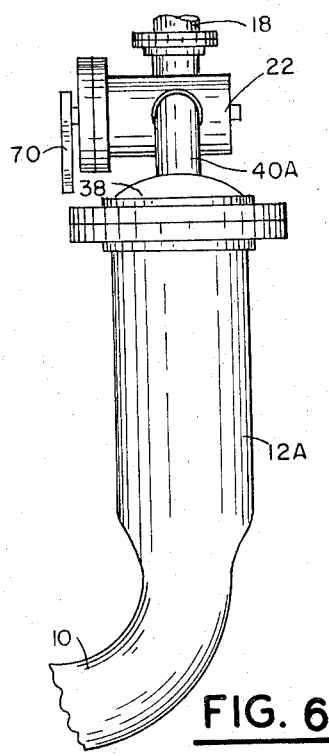
FIGURE 6 is another alternate embodiment of the ball receiving portion at each end of the U-shaped barrel.

Referring to FIGURE 6, a partial view of an alternate arrangement of the enlarged ball receiving portions of the invention are shown. Here the ball receiving end portion 12A is turned vertically. This arrangement is advantageous when high fluid flow rates are encountered, the vertical arrangement permitting greater absorption of the inertial energy of the ball as it leaves the calibrating barrel 10.

The angle of displacement of the enlarged ball receiving end portions 12 may be from a minimum up to a maximum, as shown in FIGURE 6, of 90°. The minimum angular upward extension of the enlarged end portions 12A and 12B depends upon such factors as the size of the barrel to the velocity of fluid flow and, of course, the angular displacement must be sufficient to cause the ball to automatically move back into position to re-enter the barrel 10 when fluid flow is reversed.

In FIGURES 1, 2 and 6 fluid diverter conduits 40A and 40B conduct fluid flow from the diverter valve 20 to the end 38 of the ball receiving end portions 12A and 12B. FIGURE 5 discloses an alternate arrangement wherein the diverter conduit 40A enters the enlarged end portions 12A at an intermediate point, away from the end 38. This arrangement is desirable in some instances to further reduce the inertia of ball 36 as it leaves the barrel 10. The arrangement of FIGURE 5 provides a fluid trap between the diverter conduit 40A and the end 38 so that the ball leaving the barrel at high speed encounters the fluid trap rather than end 38, its initial energy being absorbed in a fluid dash-pot effect.

Figure 8:
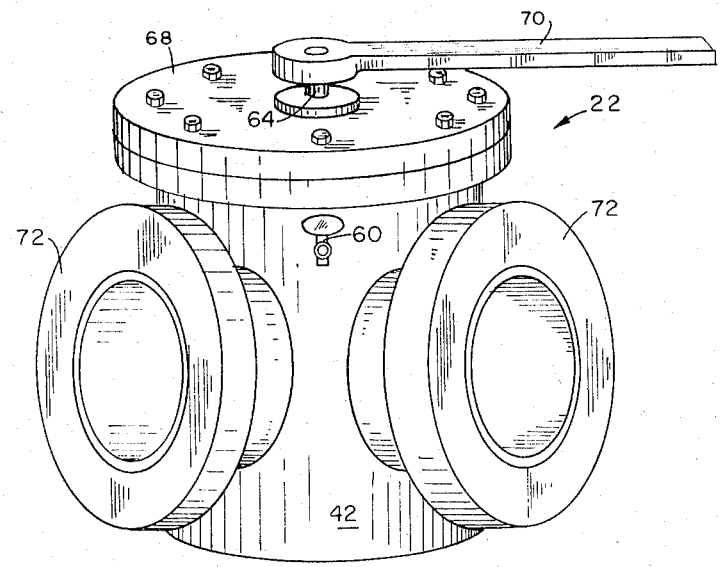
FIGURE 8 is an enlarged exterior of the flow control valve component of this invention.

As previously indicated, one of the important elements of this invention is the provision of an improved diverting valve, generally indicated by the numeral 22, and as shown in detail in FIGURES 3, 4, 7, 8, 9 and 10, to which reference is now made. FIGURE 8 is an external view of an embodiment of the diverting valve 22. The valve 22 consists of a cylindrical closed vessel 42. The vessel 42 has four openings 46 in the cylindrical wall 44, the openings 46 being connected to inlet line 28 (see FIGURE 1), outlet line 26, and the diverter conduits 40A and 40B. Connection may be made by flanges or screws fitted, flange connections being illustrated.

Pivotally supported within the closed vessel 42 is a gate member, generally identified by the numeral 24. The gate member may be a single flat disc as illustrated in FIGURES 1, 3 and 4, 9 and 10, or may be of an intermediate flat portion 48 having opposed extended wing portions 50A and 50B as shown in a cross-sectional view of FIGURE 7. Whether of the flat rectangular configuration or of the winged configuration of FIGURE 7, the gate member 24 is characterized by two continuous spaced apart gasket grooves 52A and 52B in which are positioned continuous O-ring gaskets 54A and 54B. The gaskets 54A and 54B provide a continuous space therebetween, indicated by the numeral 56, which is completely sealed when the diverting valve 22 is in a position wherein calibration of a meter is taking place.

Figure 7:
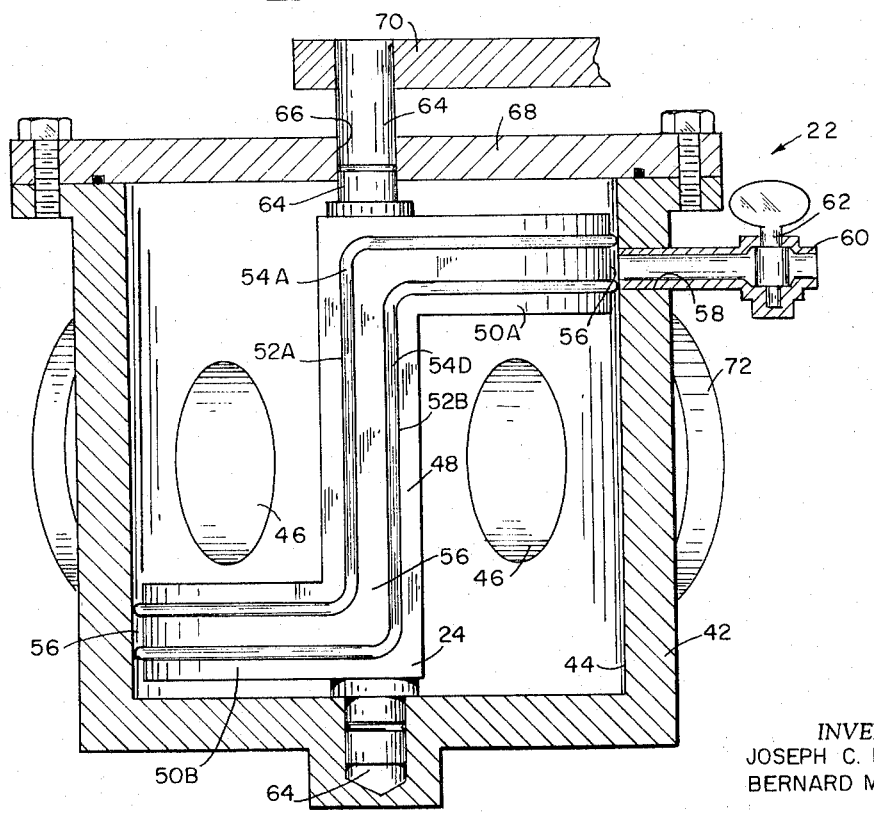
FIGURE 7 is an enlarged cross-sectional side view of the flow control valve component of this invention.

Formed in the closed vessel 20, as seen in FIGURE 7, is a small diameter opening 58 which communicates with the space 56 between O-ring gaskets 54A and 54B. Selectably closing the opening 58 is a small valve 60 of a type such as a plug valve which is opened and closed by manually rotating plug member 62.

In the arrangement shown in FIGURE 7 wherein the gate member 24 is of a configuration having parallel oppositely extending wing portions 50A and 50B only one of the small valves 60 is required to accomplish the purpose of the invention. In the arrangement wherein the gate member 24 is of rectangular configuration without the winged portions, such as shown in the cross-sectional views of FIGURES 3, 4, 9 and 10, two of such valves 60 are required.

Figure 3:
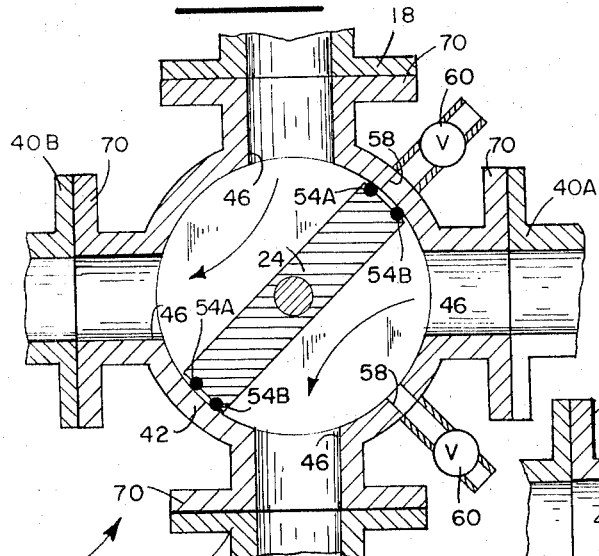
FIGURE 3 is an enlarged cross-sectional view of the flow direction valve component of the invention.
Figure 4:
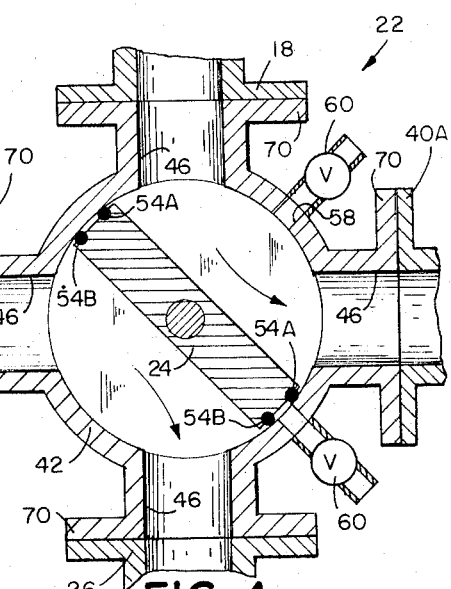
FIGURE 4 is a cross-sectional view of the flow control valve component as shown in FIGURE 2, but showing the valve oriented to a different position to change the direction of fluid flow.
Figure 9:
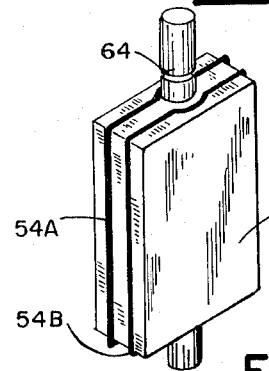
FIGURE 9 is an isometric view of the gate member of the flow control valve component.

The function of valve 60 in cooperation with the arrangement of the spaced gaskets 54A and 54B is extremely important. Referring back to FIGURE 1, it can be seen in order to accurately calibrate meter 14 fluid flow must be diverted so that all of the fluid flows first in one direction through barrel 10. While diverted in such manner it is imperative, if accuracy of calibration is to be achieved, that all of the fluid flowing through meter 14 flows through the barrel 10. Conversely, when the ball traveling within the barrel has traversed one full length of the barrel 10 and the fluid flow is reversed it is equally important that upon reversal all of the fluid flowing through meter 14 flows through the barrel 10 in the opposite direction. It is obvious that any leakage of fluid flow within the diverting valve 22 will provide an inaccurate calibration of the meter 14. The single valve 60 in the arrangement of FIGURE 7 or the two valves in the arrangement of FIGURES 3 and 4, provide a positive means of assuring that no leakage of fluid occurs within the diverter valve 22 when fluid is being diverted through barrel 10 in the forward or the reversed direction. Any fluid leakage within the valve from one side of the gate member 24 to the other would by necessity pass both gaskets 52A and 52B and would therefore fill the space 56 between the gaskets. All that is necessary to determine whether leakage is occurring is for the operator to open the small valve 60 by rotating the plug member 62. If fluid flows out of the valve 60 it is an indication that one or the other of the gaskets 54A or 54B is leaking and that the calibration of the meter is inaccurate. If no fluid flow occurs out the valve 60 positive indication is given that no leakage is occurring in the diverter valve.

With the winged gate member 24 arrangement of FIGURE 7 only one valve 60 is required since within the limited required degrees of rotation of the gate member 24 the opening 58 will always be in communication with the space 56 between the gaskets 52A and 52B. In the arrangement wherein only a rectangular gate member 24 is utilized two of such valves 60 are required, such as shown in FIGURES 1, 3 and 4. In such arrangement the valves 60 are utilized for an indication of leakage only when the gate member 24 is in a position providing communication with such valve according to the direction of flow diversion.

As shown in FIGURE 7, the gate member 24 is rotated about a stem 64 which extends through an opening 66 in top plate 68. Affixed to the externally extending portion of stem 64 is a handle 70 by which the position of gate member 24 and thereby the direction of fluid flow through barrel 10 is controlled.

This invention provides substantial improvements over the basic meter calibrator apparatuses previously known. As has been indicated, the enlarged upturned ball receiving end portions 12A and 12B provide means for automatically receiving and returning the ball to the barrel upon fluid flow reversal. Such arrangement provides means whereby the apparatus may be kept continuously on stream so that no temperature changes occur when the apparatus is utilized for calibrating a meter.

The most important advantage of the invention is the provision of the unitary fluid direction switching means 20 including the diverter valve 22. By use of this apparatus only a single valve is utilized to control all of the fluid direction flow changes required for the complete calibration of a meter. Rotating the valve 90° causes the direction of flow within the barrel to completely reverse. Previous systems of meter proving have utilized complicated multiple valve manifolding procedures which are expensive, relatively complex, and are more easily gotten out of adjustment. This invention provides an apparatus for proving meters wherein only a single lever is manipulated. An important improvement is the provision of means of automatically detecting any leakage occurring in the valve which would be a source of calibration inaccuracy.

Figure 10:
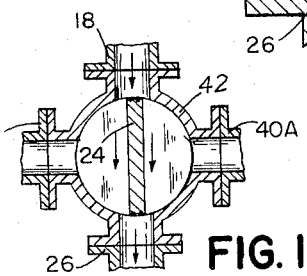
FIGURE 10 is a reduced scale cross-sectional view of the flow control valve component, as shown in FIGURES 3 and 4, but showing the gate member in an intermediate position wherein fluid flows directly through the valve without flowing in either direction through the barrel.

An important advantage of this invention is that under no circumstance, during the course of meter calibration, is fluid flow blocked. As previously indicated, only lever 70 is moved to cause fluid direction flow reversal through barrel 10. FIGURE 3 shows fluid flowing into the diverter valve from line 18, out through diverter conduit 40B to the barrel, from the barrel into the valve 22 from diverter conduit 40A, and out of the valve to outlet line 6. Rotating the gate member 24, as shown in FIGURE 4, establishes the arrangement wherein fluid continues to enter the valve 22 from inlet line 18 and flows out through outlet line 26, except that in this position of the gate member fluid flows out through diverter conduit 40A and back into the valve from diverter conduit 40B, so that the fluid flows in the opposite direction through the barrel. Thus, in either of the calibrating positions of FIGURE 3 or 4, the fluid flow path is not blocked. The question then arises: Is the fluid flow blocked at any time as the gate member 24 is rotated from one diverting position to the other? That it is not is shown in FIGURE 10. Here the gate member 24 is in an intermediate position between the calibrating positions of FIGURES 3 and 4. The gate member 24 has a width less than the diameter of openings 46. In the position of FIGURE 10, fluid flows to either side of the gate member 24 and directly out of the valve, without passing through the calibrating barrel. Thus it can be seen that, in the apparatus of this invention, no position of the diverter valve 22 blocks the fluid flow, even for an instant.

Figure 11:
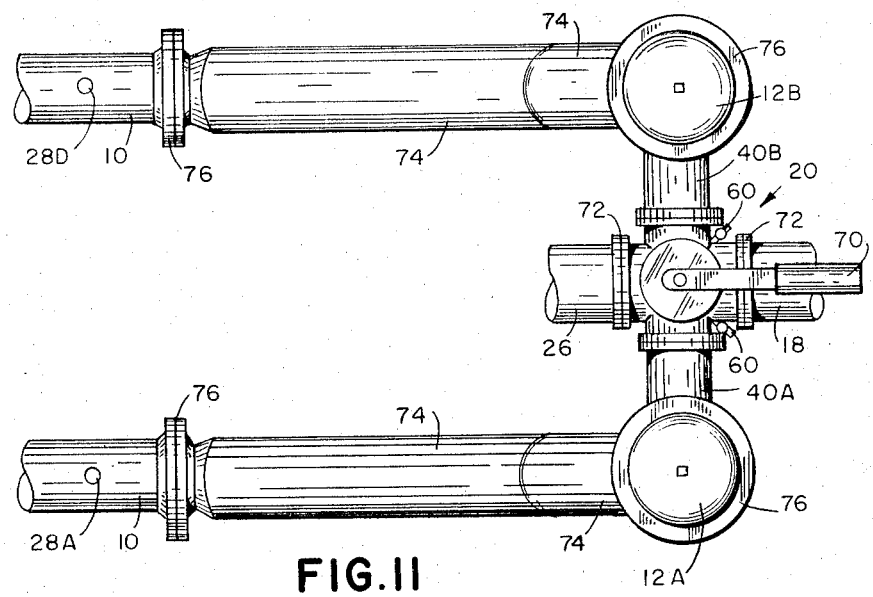
FIGURE 11 is a partial top view of an alternate embodiment of the invention.
Figure 12:
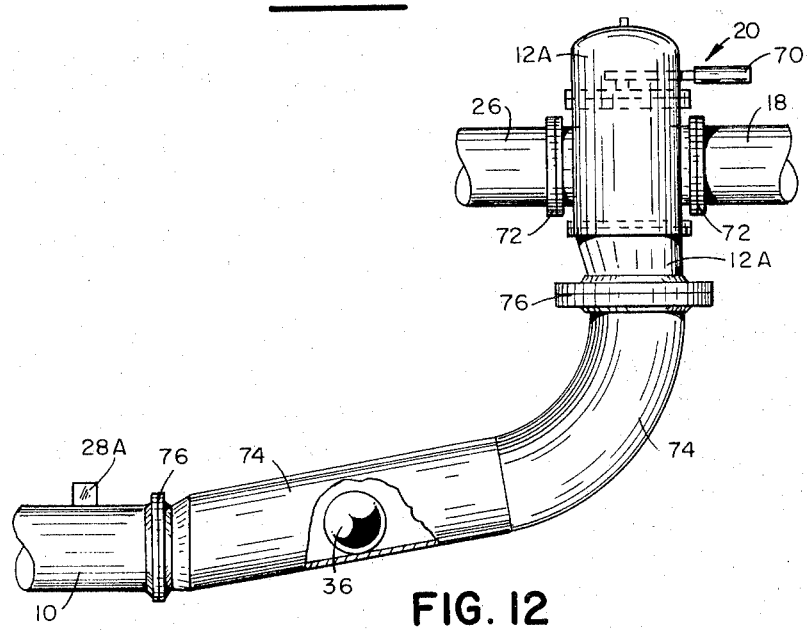
FIGURE 12 is a side view of the embodiment of FIGURE 11.

FIGURES 11 and 12 discloses an embodiment of the invention which is particularly adaptable in a system in which very high flow rates are encountered. One of the design problems encountered in provers utilized to check systems having high fluid flow rates is the tremendous inertial energy of ball 36 as it moves through the meter barrel. In larger volume installations, ball 36 weighs hundreds of pounds. When it is moved through the barrel 10 with the fluid flow at a high rate, some means must be provided to absorb this inertial energy. As previously described, the enlarged, inclined ball receiving ends 12A and 12B, shown best in FIGURES 2 and 5, help in reducing and absorbing the inertia of the ball. As previously discussed, the vertical enlarged end portion 12A of FIGURE 6 is utilized when even greater inertia absorbing capacity is needed. These arrangements are sufficient for most installations but when an exceedingly high flow rate and corresponding ball inertia is encountered, a novel alternate arrangement of this invention is illustrated in FIGURES 11 and 12.

The additional element of this embodiment shown in FIGURES 11 and 12 may be understood by comparison with the embodiments of FIGURES 1, 2, 5 and 6. Whereas in the first described embodiments the enlarged ball receiving end portions 12A and 12B are affixed directly to the ends of the barrel 10 so that ball 36 is received therein immediately upon leaving the barrel, in the embodiment of FIGURES 11 and 12 an intermediate enlarged pipe portion 74 is provided connecting the enlarged ball receiving portions 12A and 12B with barrel 10. Flanges 76 illustrate an exemplary manner by which the intermediate enlarged pipe portions 64 are connected to the barrel 10 and the enlarged end portions 12A and 12B.

The intermediate enlarged pipe portions 74 absorb the inertia and slow the movement of ball 36 in two ways. First, the diameter of this portion being larger, the fluid flow rate is naturally slower than in the smaller diameter barrel. Second, since the ball 36 is smaller in diameter than the interior of the intermediate pipe portions 74, the fluid can flow easily around the ball, allowing the ball to reduce in velocity before it enters the enlarged ball receiving end portions 12A and 12B. To further slow ball 36, the intermediate pipe portions 74 are preferably inclined, as shown in FIGURE 12.

Many pipe lines today are utilized to transport more than one type of liquid. That is, a pipe line may be used for a period to move crude oil or heating oil. Later the same line may be used to carry gasoline or diesel fuel. The use of pipe lines for multi-fluid transportation is now a common practice. An important advantage of the meter prover of this invention is that it is so arranged that when one fluid follows another through the prover, there is no contamination of the second fluid by the preceeding fluid. This valuable characteristic is achieved in the prover of this invention since the fluid containing portion of the prover is substantially completely swept by the ball and, further, the inclined or vertical enlarged ball receiving ends prevent any fluid entrapment which would later cause contamination. In addition, the arrangement of the prover of this invention permits complete purging of air or vapor.

Although this invention has been described with a certain degree of particularity, it is manifest that many changes may be made in the details of construction and the arrangement of components without departing from the spirit and scope of this disclosure.

What is claimed:

1. An apparatus for use in calibrating meters comprising:
    (a) a U-shaped horizontally extending barrel of even internal diameter;
    (b) a ball receiving portion at each end of said barrel, the ball receiving portion being of enlarged internal diameter and inclined upwardly at an angle relative to the horizontal;
    (c) a ball of external diameter substantially equal the internal diameter of the barrel, the ball forming a sealed piston in said barrel, the internal diameter of each ball receiving portion being sufficiently large that the force exerted by fluid passing between the ball and the internal diameter at normal velocities is insufficient to overcome the force of gravity tending to roll the ball down the inclined receiving portion;
    (d) a fluid conducting flow means communicating with each ball receiving portion;
    (e) first and second piston detecting means in longitudinally spaced relationship at points in said barrel actuated by passage of said ball; and
    (f) fluid direction switching means communicating with said fluid conducting flow means whereby fluid may be caused selectably to flow in both directions through said barrel, said ball being moved as a piston by such fluid flow and whereby said ball enters the said inclined enlarged ball receiving portion at the end of each movement by fluid flow and wherein said ball automatically re-enters said piston when the fluid flow is reversed.

2. An apparatus according to claim 1 wherein said fluid flow conducting means includes a conduit communicating with each ball receiving portion coaxially and at the end thereof.

3. An apparatus according to claim 1 wherein each of said integral enlarged ball receiving portions extend substantially vertically.

4. An apparatus according to claim 1 wherein said fluid flow conducting means includes:
    (a) a fluid inlet conduit;
    (b) a first diverter conduit communicating with one of said ball receiving portions;
    (c) a fluid outlet conduit;
    (d) a second diverter conduit communicating with the other of said ball receiving portions; and
    (e) a diverting valve defined by
        (1) a closed vessel having a cylindrical interior surface,
        (2) an inlet opening having said fluid inlet conduit connected thereto,
        (3) an outlet opening having said fluid outlet conduit connected thereto,
        (4) a first diverter opening having said first diverter conduit connected thereto,
        (5) a second diverter opening having said second diverter conduit connected thereto, said openings in uniplanar spaced quadrant relationship,
        (6) a gate member rotatably positioned in said body having sealed engagement with said interior cylindrical surface, said gate member positionable to divert flow from said inlet out through selectably one of said first and second diverter openings; and
        (7) means of externally selectably positioning said gate member.

5. An apparatus according to claim 4 wherein said gate member has a width less than the diameter of said openings in said diverter valve.

6. An apparatus for calibrating a flow meter in a pipeline comprising:
    (a) a signal means for producing a signal directly proportional to the output of said flow meter;
    (b) a horizontally extending barrel of even, internal diameter;
    (c) an enlarged internal diameter piston receiving portion at each end of said barrel, each of said receiving portions being inclined upwardly relative to the horizontal;
    (d) a movable piston of external diameter substantially equal the internal diameter of the barrel and having sealed engagement with the internal wall of said barrel, the internal diameter of each piston receiving portion being sufficiently large that the force exerted by fluid passing between the piston and the internal diameter at normal velocities is insufficient to overcome the force of gravity tending to move the piston down the inclined receiving portion;
    (e) first and second piston detecting switches in longitudinally spaced relationship at points in said barrel actuated by passage of said piston;
    (f) a fluid inlet conduit by which fluid is conducted to the apparatus;
    (g) a first diverter conduit communicating with one of said piston receiving portions;
    (h) a fluid outlet conduit by which fluid is conducted away from the apparatus;
    (i) a second diverter conduit communicating with the other of said piston receiving portions;
    (j) a diverter valve defined by
        (1) a closed vessel having a cylindrical interior surface,
        (2) an inlet opening having said fluid inlet conduit connected thereto,
        (3) an outlet opening having said fluid outlet conduit connected thereto,
        (4) a first diverter opening having said first diverter conduit connected thereto,
        (5) a second diverter opening having said second diverter conduit connected thereto, said openings lying in uniplanar spaced quadrant relationship,
(6) a gate member rotatably positioned in said body having sealed engagement with said interior cylindrical surface, said gate member positionable to divert flow from said inlet out through selectably one of said first and second diverter openings; and
(7) means of externally selectably positioning said gate member (k) and counter connected to said signal means adapted to measure said signal and produce an indication of said measurement, said counter being connected to said piston detecting switches such that actuation of one initiates said counter while actuation of the other terminates operation of said counter, the meter being in series with one of said fluid inlet and fluid outlet conduits.

7. An apparatus according to claim 6 wherein said valve gate member has paralleled spaced apart gasket grooves around the total periphery thereof, and wherein said closed vessel has at least one small diameter opening therein intermediate said spaced inlet, outlet and diverter openings, and including:
(l) a continuous gasket positioned in each of said gasket grooves in said gate member forming sealed engagement with the interior of said closed vessel and said gaskets forming a sealed space therebetween; and
(m) a small valve closing each of said small diameter openings in said closed vessel whereby when said gate member is in a flow diverting position one of said small valves may be opened to provide communication with said sealed space between said gaskets to thereby indicate whether either of said gaskets is leaking.

8. An apparatus according to claim 6 wherein said enlarged internal diameter piston receiving portions are axially inclined relative to the horizontal.

9. An apparatus according to claim 6 wherein the width of said gate member is less than the diameter of said openings in said diverter valve.

References Cited by the Examiner
UNITED STATES PATENTS

| | | | |
|---|---|---|---|
| 2,703,586 | 3/1955 | Asker | 137—625.43 |
| 2,792,705 | 5/1957 | Barrett | 73—3 |
| 3,191,628 | 6/1965 | Kirkwood | 137—625.43 |
| 3,224,247 | 12/1965 | Barrett | 73—3 |
| 3,232,090 | 2/1966 | Walker | 73—3 |

LOUIS R. PRINCE, *Primary Examiner.*

S. C. SWISHER, *Assistant Examiner.*